United States Patent
Haak

[19]

[11] Patent Number: 6,032,541
[45] Date of Patent: Mar. 7, 2000

[54] SUSPENDED BODY FLOW METER

[76] Inventor: Reinhard Haak, Trienendorfer Strasse 139, 8300 Wetter, Germany

[21] Appl. No.: 08/982,778

[22] Filed: Dec. 2, 1997

[30] Foreign Application Priority Data

Dec. 5, 1996 [DE] Germany ............................ 196 50 361

[51] Int. Cl.[7] .................................................. G01F 15/00
[52] U.S. Cl. ........................................................ 73/861.77
[58] Field of Search .................... 73/273, 861.42–861.62, 73/861.71–861.94, 431

[56] References Cited

U.S. PATENT DOCUMENTS

| 2,704,349 | 3/1955 | Sheenan | 73/431 |
| 2,854,848 | 10/1958 | Hood | 73/431 |
| 3,638,119 | 1/1972 | Mackenzie | 73/431 |
| 4,055,141 | 10/1977 | Homs | 73/431 |
| 4,154,101 | 5/1979 | Buchanan et al. | 73/273 |
| 4,552,018 | 11/1985 | Legatti et al. | 73/431 |
| 4,938,076 | 7/1990 | Buchanan | 73/861.53 |
| 5,483,838 | 1/1996 | Holden | 73/861.61 |
| 5,565,630 | 10/1996 | Shene | 73/861.76 |

FOREIGN PATENT DOCUMENTS

| 2 004 514 | 2/1970 | Germany . |
| 82 26 199 | 9/1982 | Germany . |
| 87 09 747 | 7/1987 | Germany . |
| 89/04464 | 5/1989 | WIPO . |

Primary Examiner—William Oen

[57] ABSTRACT

A suspended body flow meter for flowing media with a measuring tube, with a suspended body movable in the direction of flow and located in the measuring tube, with at least one permanent magnet connected with the suspended body, with a meter housing, with at least one rotatable follower magnet following the motions of the permanent magnet connected with the suspended body and located outside the measuring tube in the meter housing and with a display device converting the motions of the follower magnet and located in the meter housing. The meter housing is designed so that at least one slide-in guide is provided for a slide-in element bearing mechanical and/or electrical functional units.

8 Claims, 4 Drawing Sheets

SUSPENDED BODY FLOW METER

In accordance with a first teaching, the invention concerns a suspended body flow meter for flowing media, with a measuring tube, with a suspended body movable in the direction of flow and located in the measuring tube, with at least one permanent magnet connected with the suspended body, with a meter housing, with at least one rotatable follower magnet following the motions of the permanent magnet connected with the suspended body and located outside the measuring tube in the meter housing, and with a display device which converts the motions of the follower magnet and is located in the meter housing.

In accordance with a second teaching, the invention concerns a meter housing for a suspended body flow meter for flowing media, with at least one rotatable follower magnet following the motions of a permanent magnet connected with a suspended body mounted movable in the direction of flow in a measuring tube and with a display device which converts the motions of the follower magnet.

BACKGROUND OF THE INVENTION

Suspended body flow meters have been used since the middle of the last century for determining volume and mass flows in closed pipelines. Even today they can be found in approximately every fifth flow meter in the chemical and materials processing industry.

A suspended body flow meter, in its simplest form, consists of a conical measuring tube and the suspended body. The measuring tube is a conical tube expanding upward through which the liquid or gas flow to be measured flows upward, in which tube the suspended body, an appropriately shaped, vertically freely movable measuring element, is located, which, together with the measuring tube, forms a restrictor. The density of the suspended body is greater than that of the flowing medium. Depending on the flow, the suspended body adjusts itself in the steady state at a specific level position in the measuring tube, which results from the equilibrium of the hydrodynamic force acting on the suspended body, caused by the flow, and the difference of the weight and buoyancy forces of the suspended body. This level position is either read by the observer directly via a scale on a glass measuring tube or transferred by a magnetic coupling to an external scale and/or an electric sensor. The suspended body flow meter under consideration is such a meter in which the level position of the suspended body can be transferred by means of a magnetic coupling via an external follower magnet to a scale located in the meter housing and/or an electric sensor also located in the meter housing.

In addition to the designs with conical measuring tube and spherical or sharp-edged suspended bodies, straight measuring tubes with a measuring orifice and a conical suspended body within the orifice opening can be used. Also it is conceivable not to arrange the measuring tube vertically, in this case it being necessary to replace the weight force of the suspended body with the spring force of a spring acting on the suspended body.

The invention under consideration essentially concerns the design of the meter housing which holds at least the follower magnet and the display device converting the motion of the follower magnet, which is independent of the variation possibilities described in the case of the design of a suspended body flow meter. The second teaching of the invention here takes account of the possibility that, in the case of measurement tubes already incorporated into closed pipelines, there is the possibility of backfitting only the meter housing if necessary.

The known meter housings used in connection with suspended body flow meters for flowing media are all designed in such a way that additional mechanical and/or electrical functional units can only be connected with either the meter housing itself via screw connections or a bearing bushing of the pointer shaft bearing the pointer or the pointer shaft itself via push-on or screw connections. In the first place, it should be mentioned that suspended body flow meters are regularly supplied only in one basic design, therefore perhaps without a transmitter converting the motions of the follower magnet into electric signals or without a threshold value display arrangement mechanically displaying or electrically outputting the reaching of a minimum or maximum range of the suspended body. In the case of backfitting this suspended body flow meter with further functional units, the known methods of attachment entail problems, since they are difficult to carry out depending on the position of the suspended body flow meter and, in particular, they require increased caution in the connection with the pointer shaft.

A particular problem results from the fact that in a number of suspended body flow meters it is usual to mount on the pointer shaft a counteraeight or calibration weight with a center of gravity outside of the pointer axis for calibrating the suspended body flow meter, the position of which is determined individually in a calibration process for each suspended body flow meter. Now in order to mount the threshold value pointer arrangement with a possibly associated electrical contactor onto the bearing bushing for the pointer shaft and the associated actuating lugs on the pointer shaft itself, in the case of this suspended body flow meter, the counterweight or calibration weight must be removed from the pointer shaft. Thus, the backfitting of this known suspended body flow meter requires that then the suspended body flow meter concerned is subjected to recalibration for determining the position of the counterweight or calibration weight. This is very problematical for various reasons. First, the suspended body flow meter has to be removed from the pipeline system of the plant for calibration, which, as a rule, requires an interruption of the production process. In the second place, the calibration requires trained special personnel, which are not available at every plant, and, in addition, increased costs if they are available. Finally, in the third place, it is problematical that the necessary calibration only is to be performed by means of a calibrating device for adjusting a known flow through the suspended body flow meter. Of course, providing such a calibrating device entails considerable costs.

SUMMARY OF THE INVENTION

Therefore, the object of the invention is to design and further develop the known suspended body flow meters for flowing media in such a way that they are equipped, or can be backfitted, with meter housings which permit backfitting of the suspended body flow meters with additional functional units without problems and without trained personnel.

In accordance with the first teaching of the invention, the previously derived and indicated object is solved by the fact that the meter housing has at least one slide-in guide for a slide-in element bearing mechanical and/or electrical functional units. In accordance with the second teaching of the invention, the previously derived and indicated object is solved by the fact, a meter housing for a suspended body flow meter has at least one slide-in guide for a slide-in element bearing mechanical and/or electrical functional elements. The design according to the first and second teachings of the invention advantageously ensures that the backfitting with additional mechanical and/or electrical functional units can be performed very simply and rapidly without special personnel and without subsequently required calibration. The backfitting is simplified to the degree that it can be performed, for example, by a plant electrician within the framework of his usual activities. In addition, the invention also insures that the process of producing a correspondingly designed meter housing is considerably simplified with respect to the known meter housings.

In accordance with a first advantageous design, a device in accordance with the invention is characterized by the fact that the slide-in element is designed as a scale carrier. Such a design simplifies, in particular in the production process, using one and the same meter housing in connection with measuring tubes of different nominal widths and a correspondingly adapted scale carrier. Particularly advantageous in this connection is the simultaneous realization of the present teachings in accordance with the invention in connection with the teaching disclosed in commonly owned application Ser. No. 08/926,555, filed Sep. 10, 1997, whose disclosure is incorporated by reference herein, which concerns a suspended body flow meter, which is equipped with a follower magnet, which makes it possible to use scales of equal spreading in spite of different nominal values of the measuring tube. In addition, backfitting by means of further slide-in elements is simplified, since the scale carrier can be disassembled very easily and thus also providing access to further slide-in elements from the top.

It is especially advantageous to design the devices in accordance with the invention so that the slide-in element bears at least one threshold value pointer arrangement having a threshold value pointer. The assembly of such a threshold value pointer arrangement has always been exceedingly expensive in the case of prior art suspended body flow meters and regularly required, as already described initially, a recalibration of the suspended body flow meter. By means of the design in accordance with the invention, it is ensured that the assembly of a threshold value pointer arrangement can be performed in minutes by personnel who are not specially trained, therefore, perhaps, by a plant electrician.

The threshold value pointer arrangement in accordance with the invention, located on the slide-in element, is designed particularly advantageously in such a way that it has a recess making possible lateral sliding onto the bearing bushing of the pointer shaft forming a radial bearing interacting with the bearing bushing. In the case of a design of this type, the recess provided in the threshold value pointer arrangement simultaneously serves as a stop for the slide-in element bearing the threshold value pointer arrangement and as a radial bearing, which makes possible a centered turning of the threshold pointer arrangement around the axis of the pointer.

The necessary guiding of the threshold value pointer arrangement in addition to the radial bearing formed by the bearing bushing and the recess is provided particularly advantageously by the fact that the threshold value pointer arrangement is connected via a slot guide with the associated slide-in element. In this case, a slot running in the circumferential direction, provided in the threshold value pointer arrangement, works together with a fastening bolt provided in the slide-in element as a connecting link guide. Such an attachment is particularly simple to make and, moreover, makes it possible to attach, for example, two threshold pointer arrangements with a single attachment bolt, so that these are capable of turning around the axis of the pointer in interaction with the bearing bushing.

If the threshold value pointer arrangement simultaneously bears the electrical contactor, it is especially easy to ensure that with the insertion of the associated slide-in element, both the mechanical indication of reaching the threshold values for the minimum and maximum ranges by means of the threshold value pointer, as well as the electrical display of reaching the minimum and maximum range by means of the electrical contactor, are possible.

A device in accordance with the invention is further simplified because the counterweight of the pointer forms an actuating lug for the electrical contactor. By means of this measure, it is possible to avoid using separate actuating lugs on the pointer shaft.

If the slide-in element is designed further as a printed circuit board, it is possible by means of this measure, at the same time to mount on the slide-in element, besides the mechanical functional unit, an electrical functional unit, which can then simply be connected via electrical screw or plug connections with the remaining electrical components of the suspended body flow meter.

If the slide-in element bearing the threshold pointer arrangement is also designed simultaneously as a printed circuit board, it is particularly advantageous that the printed circuit board also bears necessary electronic components for controlling the electrical contactor. This creates a functional unit which permits equipping an already existing device with a mechanical and electrical minimum and maximum display in a single process taking only a few minutes.

In particular there are different possibilities for equipping and rebuilding the suspended body flow meter or the meter housing in accordance with the invention. Reference is made here, on the one hand, to the dependent patent claims, and, on the other hand, to the description of preferred embodiments in connection with the drawings.

DETAILED DESCRIPTION OF ILLUSTRATIVE EMBODIMENTS

Figure 1:
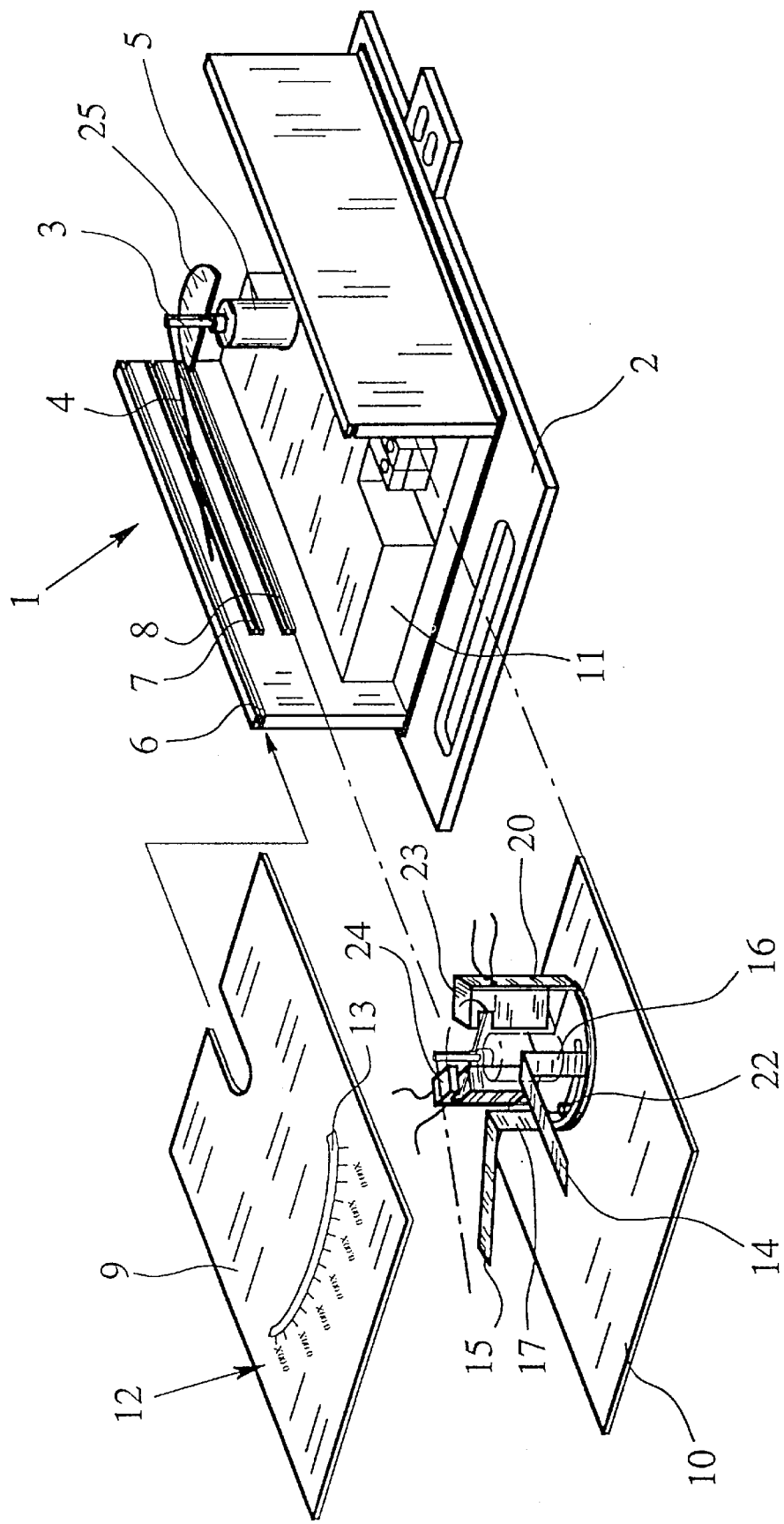
FIG. 1 shows an exploded view of a first embodiment of a meter housing in accordance with the invention for a suspended body flow meter.
Figure 4:
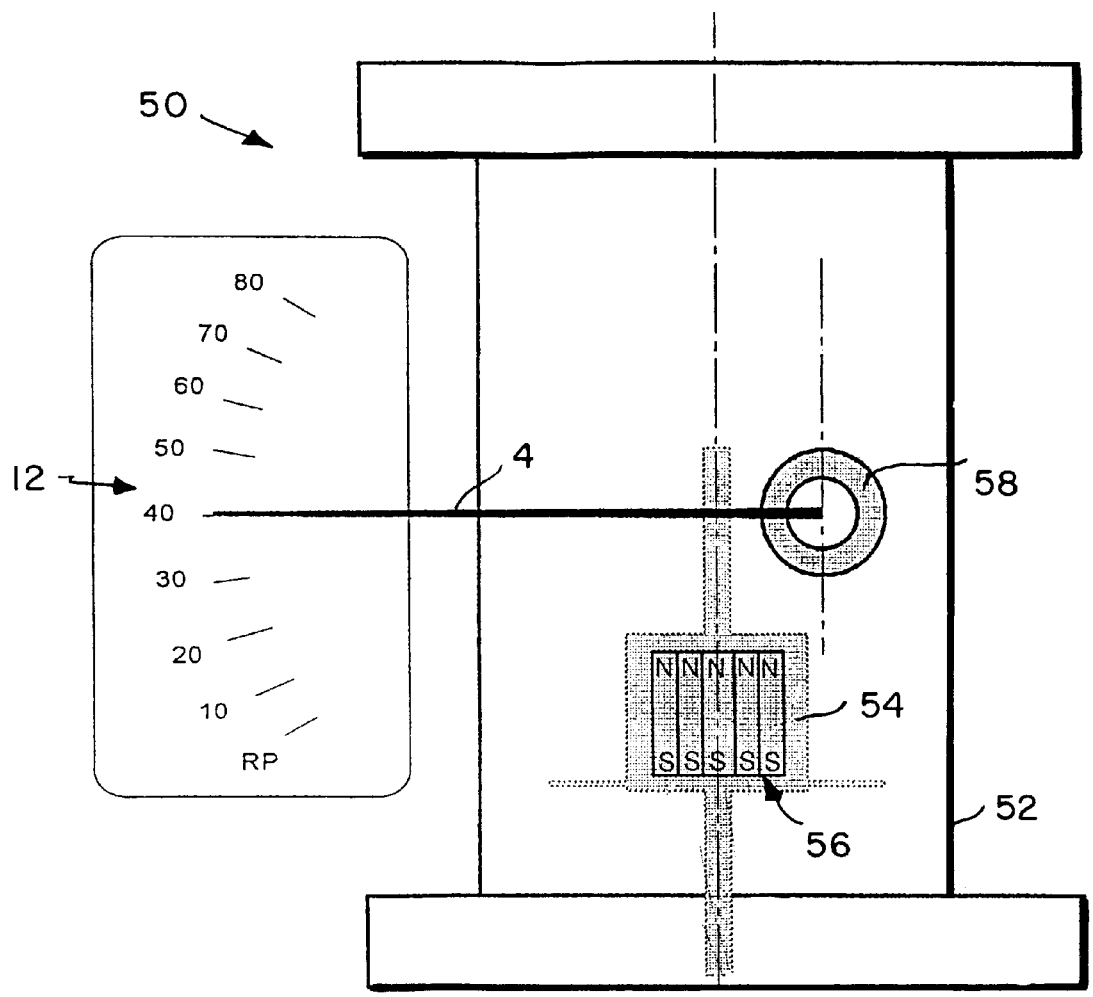
FIG. 4 shows a suspended body flowmeter that may be associated with the FIG. 1 meter housing.

FIG. 1 of the drawings shows a meter 50 depicted in FIG. 4 housing 1 for a suspended body flow meter with a measuring tube 52, with a suspended body 54, mounted in the measuring tube and movable in the direction of flow, and with a permanent magnet 56, connected with the suspended body. A rotatable follower magnet 58 following the motions of the permanent magnet connected with the suspended body, is located in a housing bottom 2 of the meter housing 1 in FIG. 1. The previously mentioned pending application is to be consulted for details of the design of this follower magnet and the flowmeter as a whole. The display device located within the meter housing 1, which converts the motions of the follower magnet, in the first embodiment of a meter housing shown in FIG. 1, is made as a pointer 4 located on a pointer shaft 3 connected with the follower magnet. The pointer shaft 3 is mounted in a bearing bushing 5 in the embodiment shown here. In accordance with the invention, the meter housing 1 has three slide-in guides 6, 7, 8 for slide-in elements 9,10 bearing mechanical and/or electrical functional units.

In the case of the first embodiment of a meter housing in accordance with the invention, shown in FIG. 1, a transmitter 11 converting the motions of the follower magnet into electrical signals is attached to the housing bottom 2.

The first slide-in element 9 is designed as a scale carrier in the first embodiment shown in FIG. 1. This first slide-in element 9 has a recess for the pointer shaft 3. In addition to the scale division 12 printed on the first slide-in element 9, there is a slot 13 through which the ends of threshold value pointers 14,15, which display the maximum or minimum range, are visible. The threshold value pointers 14, 15 serve, as is known from the prior art, for marking maximum and minimum ranges, within which the current flow value is critical and requires a correction. The first slide-in element 9 designed as a scale carrier is pushed into the uppermost slide-in guide 6 of the meter housing 1. This uppermost slide-in guide 6 differs from the two lower slide-in guides 7,8, since it is directly visible through a cover, not shown, and thus should be made visually attractive.

The second slide-in element 10 is capable of being pushed into the lowest slide-in guide 8 shown in the embodiment shown in FIG. 1, which element bears two threshold display arrangements 16, 17, in each case having a threshold pointer 14, 15.

Figure 2:
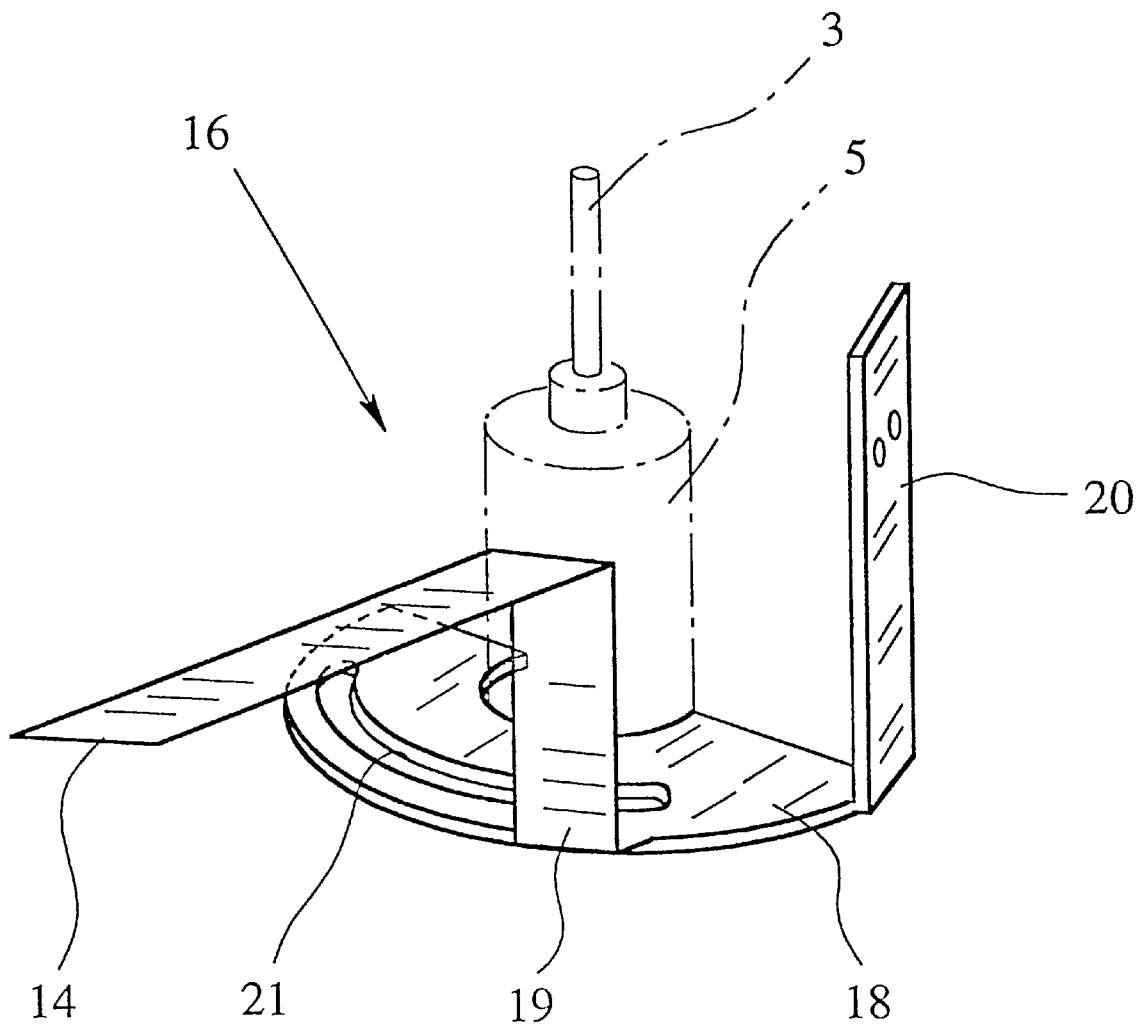
FIG. 2 shows a perspective view of an embodiment of a threshold value pointer arrangement in accordance with the invention.

An embodiment of such a threshold pointer arrangement 16 is shown enlarged in FIG. 2. This embodiment of a threshold value pointer arrangement 16 consists of a semicircular base plate 18, a pointer attachment 19, the threshold value pointer 14, and an attachment 20 for electrical contactors not shown here. Preferably, this threshold value pointer arrangement 16 is made in one piece out of sheet metal. A recess, which makes it possible to push the threshold value pointer arrangement 16 sideways onto the bearing bushing 5 of the pointer shaft 3, now is provided in the threshold value pointer arrangement 16. The radius of the recess in this case is matched to the radius of the bearing bushing 5 exactly, so that the recess and the bearing bushing 5 interact creating a radial bearing receiving forces directed radially inward.

For receiving any forces directed radially outward, the threshold value pointer arrangement has a slot 21 extending parallel to the circumference, which forms a slot guide in the nature of a connecting link guide, shown in FIG. 1, for the bolt 22 attached to the second slide-in element 10. This slot guide, together with the radial bearing formed by the recess and the bearing bushing 5, ensures that the threshold value pointer arrangement can rotate around the pointer axis. Instead of a bolt 22, it is also possible to provide a screw which can be tightened according to the setting of the threshold value pointer arrangements 16, 17 in order to fix these settings. This fixing of these settings can alternatively be ensured by means of a gluing point.

FIG. 1 also shows that the threshold value pointer arrangements 16, 17 bear electric contactors 23, 24 on their attachments. The electrical contactors 23, 24 in each case have slots, into which an actuating lug 25 connected with the pointer shaft 3 depending on the pointer position can enter and can influence the electrical contactors 23, 24. In the embodiment shown, the actuating lug 25 is made in one piece with the pointer 4, at the same time forming the counterweight to the weight of the pointer 4 and thus provides for the balancing of the moments on the pointer shaft 3. Therefore, as opposed to known suspended body flow meters, the actuating lug 25 is already provided in each basic design of the associated meter housing, so that when backfitting one or more threshold pointer arrangements, no additional actuating lug has to be attached to the pointer shaft 3.

Finally, in the case of the embodiment shown in FIG. 1, the second slide-in element 10 is made as a printed circuit board, this bearing at least the electronic components, not shown here, necessary for controlling the electrical contactors. It is conceivable to mount further electronic components, perhaps a driver for bridging over great distances between the suspended body flow meter and a central command post on the printed circuit board forming the second slide-in element 10, in addition to the electronic components for controlling the electrical contactors.

Figure 3:
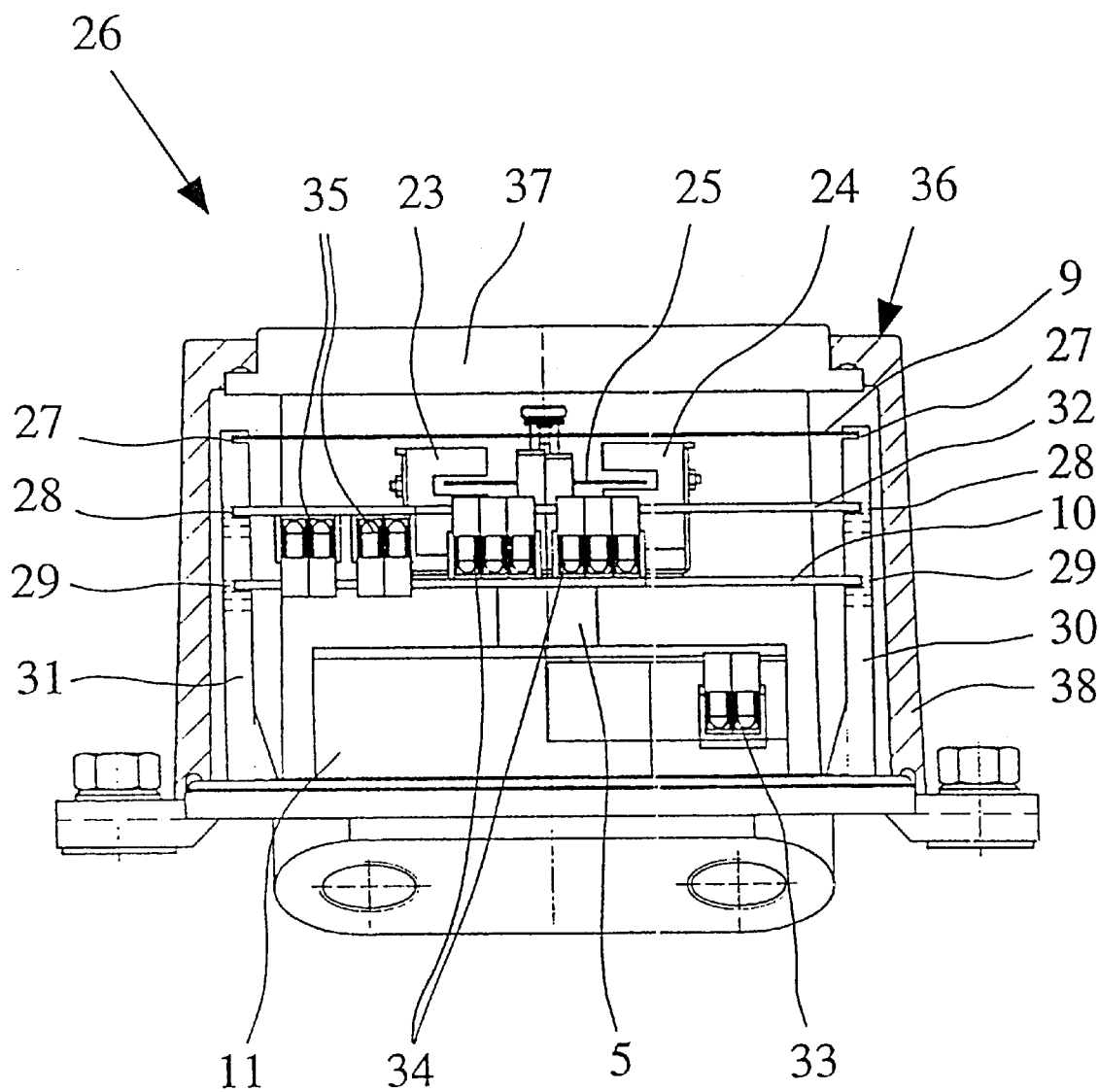
FIG. 3 shows a side view, partially cut away, of a second embodiment of a meter housing in accordance with the invention for suspended body flow meters.

FIG. 3 of the drawing shows a second embodiment of a meter housing 26 in accordance with the invention. In the case of this second embodiment, all three slide-in guides 27, 28, 29 are designed as slots in the side walls 30, 31. In contrast to this, in the first embodiment shown in FIG. 1, the two lower slide-in guides 7, 8 consist of plastic guide rails set on the side walls. Also a third slide-in element 32 bearing mechanical and/or electrical functional units is inserted in the second embodiment shown in FIG. 3. The electrical connections between the slide-in elements 10, 32 and the transmitter 11, respectively, and an outer voltage supply are provided via electrical plug or screw connections 33, 34, 35.

Finally, FIG. 3 of the drawing also shows a cover 36 not shown in FIG. 1, which consists of a transparent window 37 and a casing 38. All further components of the second embodiment in common with the first embodiment shown in FIG. 1 are provided with the identical reference numbers.

What is claimed is:

1. A suspended body flow meter for flowing media, with a measuring tube, with a suspended body movable in the direction of flow located in the measuring tube, with at least one permanent magnet connected with the suspended body, with a meter housing, with at least one rotatable follower magnet following the motions of the permanent magnet connected with the suspended body and located outside the measuring tube in the meter housing, and with a display device converting the motions of the follower magnet and located in the meter housing, wherein the meter housing has at least one slide-in guide for a slide-in element bearing mechanical and/or electrical functional units, the slide-in element bears at least one threshold value pointer device having a threshold value pointer, and the threshold value pointer device bears an electrical contactor.

2. A meter housing for a suspended body flow meter for flowing media, with at least one rotatable follower magnet following the motions of a permanent magnet connected with a suspended body movably mounted in the direction of flow in a measuring tube, and with a display device which converts the motions of the follower magnet, wherein at least one slide-in guide for a slide-in element bearing mechanical and/or electrical functional elements is provided, the slide-in element bears at least one threshold value pointer device having a threshold valve pointer, and the threshold valve pointer device bears an electrical contactor.

3. The suspended body flowmeter in accordance with claim 1, or the meter housing in accordance with claim 2 wherein the slide-in element is made as a scale carrier.

4. The suspended body flow meter in accordance with claim 1, or the meter housing in accordance with claim 2, wherein the threshold value pointer device has a recess making it possible to push the threshold value pointer device laterally onto a bearing bushing of a pointer shaft and forming a radial bearing by interacting with the bearing bushing.

5. The suspended body flow meter in accordance with claim 1, or the meter housing in accordance with claim 2, wherein the threshold value pointer device is connected with the associated slide-in element via a slot guide.

6. The suspended body flow meter in accordance with claim 1, or the meter housing in accordance with claim 2, wherein the pointer is provided with a counterweight, and wherein the counterweight of the pointer forms an actuating lug for the electrical contactor.

7. The suspended body flow meter in accordance with claim 1, or the meter housing in accordance with claim 2, wherein the slide-in element is made as a printed circuit board.

8. The suspended body flow meter or meter housing in accordance with claim 7, wherein the printed circuit board bears at least the electronic components necessary for controlling the electrical contactors.

* * * * *